United States Patent [19]

Komeya et al.

[11] 4,226,841
[45] Oct. 7, 1980

[54] METHOD OF PRODUCING SILICON CARBIDE POWDER

[75] Inventors: Katsutoshi Komeya, Yokohama; Hiroshi Inoue, Kawaguchi; Haruo Kudo, Kamakura; Hiroshi Endo, Yokohama, all of Japan

[73] Assignee: Tokyo Shibaura Denki Kabushiki Kaisha, Kawasaki, Japan

[21] Appl. No.: 18,264

[22] Filed: Mar. 7, 1979

[30] Foreign Application Priority Data

Mar. 10, 1978 [JP] Japan .................................. 53/26597

[51] Int. Cl.$^2$ ............................................. C01B 31/36
[52] U.S. Cl. ...................................... 423/345; 106/44
[58] Field of Search ........................... 423/345; 106/44

[56] References Cited

U.S. PATENT DOCUMENTS

| | | | |
|---|---|---|---|
| 3,271,109 | 9/1966 | Mezey et al. | 423/345 |
| 3,758,672 | 9/1973 | Lewis | 423/345 |
| 3,855,395 | 12/1974 | Cutler . | |

FOREIGN PATENT DOCUMENTS 2452799  5/1975  Fed. Rep. of Germany .

*Primary Examiner*—Jack Cooper
*Attorney, Agent, or Firm*—Oblon, Fisher, Spivak, McClelland & Maier

[57] ABSTRACT

A method of producing a silicon carbide powder consisting of fine particles of uniform shape and size, comprising baking at 1,350° to 1,850° C. under a non-oxidizing atmosphere a powdery mixture consisting of 1 part by weight of silica powder or a compound forming silica powder at high temperatures, carbon powder or a compound forming carbon powder at high temperatures, and silicon carbide or a substance forming silicon carbide at high temperatures, the amounts of the silica powder-forming compounds, the carbon powder-forming compounds and the silicon carbide powder-forming substance being determined such that the amounts of the formed powders are equal to those specified above.

5 Claims, 2 Drawing Figures

METHOD OF PRODUCING SILICON CARBIDE POWDER

BACKGROUND OF THE INVENTION

This invention relates to a method of producing silicon carbide powder, particularly to a method of producing a silicon carbide powder consisting of fine particles of uniform shape and size.

Silicon carbide is excellent in high-temperature stability, mechanical strength, thermal conductivity, etc. and, thus, extensively used as materials of, for example, atomic reactors, chemical plants, hot gas processing apparatuses, electrical heating elements and electron resistors. In particular, silicon carbide is useful as a high-temperature engineering material. Thus, vigorous researches are being made in an attempt to develop a silicon carbide material effective for saving energy and natural resources. In order to obtain materials suitable for such uses, it is necessary to use a silicon carbide powder consisting of fine particles of uniform shape and size as the material which is to be sintered.

It is customary to employ, for example, the reaction between silica and carbon for producing silicon carbide powder. However, any of conventional techniques in this field fails to provide a silicon carbide powder consisting of fine particles of uniform shape and size, rendering it substantially impossible to obtain a sintered silicon carbide of satisfactory properties.

SUMMARY OF THE INVENTION

An object of this invention is to provide a method of producing a silicon carbide powder consisting of fine particles of uniform shape and size.

According to this invention, there is provided a method of producing silicon carbide powder, comprising baking at 1,350° C. to 1,850° C. under a non-oxidizing atmosphere a powdery mixture consisting of 1 part by weight of silica powder or a compound forming silica powder at high temperatures, 0.5 to 4 parts by weight of carbon powder or a compound forming carbon powder at high temperatures and 0.05 to 1 parts by weight of silicon carbide powder or a substance forming silicon carbide powder at high temperatures, the amounts of the silica powder-forming compounds, the carbon powder-forming compounds and the silicon carbide powder-forming substance being determined such that the amounts of the formed powders are equal to those specified above.

PREFERRED EMBODIMENT OF THE INVENTION

Figure 1:
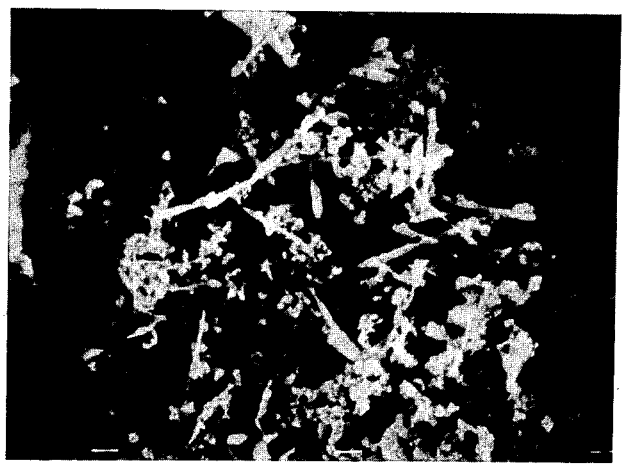
FIG. 1 is an electron photomicrograph showing silicon carbide powder particles obtained by a conventional method.

In this invention, the desired silicon carbide powder is obtained from the raw material of a powdery mixture consisting of silica powder or a compound forming silica powder at high temperatures, carbon powder or a compound forming carbon powder at high temperatures, and a nucleating agent provided by silicon carbide powder or a substance forming silicon carbide powder at high temperatures. It has been found that the use of the nucleating agent permits producing a silicon carbide powder consisting of fine particles of very uniform shape and size.

Any kind of silica powder can be used in this invention as an ingredient of the powdery mixture, including, for example, a crystalline silica powder such as ground siliceous sand, ground rock crystal, or ground silica glass, and a non-crystalline silica powder such as volatilized silica powder, anhydrous silica powder obtained by vapor phase synthesis, or precipitated silica powder. The compounds forming silica powder at high temperatures include, for example, tetraethoxysilane ($Si(C_2H_5O)_4$), methyltrichlorosilane ($CH_3SiCl_3$) and sodium silicate ($Na_2O\text{---}SiO_2$).

Any kind of carbon powder can be used in this invention as another ingredient of the powdery mixture, including, for example, carbon black and graphite. The compounds forming carbon powder at high temperatures includes various synthetic resins.

Likewise, any kind of silicon carbide powder can be used in this invention as the nucleating agent, provided that the particle size thereof is not larger than that of the aimed product of silicon carbide powder. For example, it is possible to prepare the nucleating agent by sieving a silicon carbide powder produced by a conventional method and available on the market. It is also possible to use as the nucleating agent the silicon carbide powder obtained by the method of this invention. On the other hand, polycarbosilane can be used as the substance forming silicon carbide powder at high temperatures. It is also possible to use elemental silicon together with carbon so as to form silicon carbide powder when heated.

It is preferred that any of the silica powder, carbon powder and silicon carbide powder mentioned above have a particle size of at most $0.5\mu$ and purity of at least 99%.

The amount of carbon powder should range between 0.5 and 4 parts by weight, preferably, between 0.6 and 2 parts by weight relative to 1.0 part by weight of silica powder. If the amount of carbon powder is smaller than 0.5 part by weight, the produced silicon carbide powder is caused to contain the unreacted silica. On the other hand, the value exceeding 4 parts by weight leads to a low yield of silicon carbide.

The amount of silicon carbide powder acting as the nucleating agent should range between 0.05 and 1 part by weight, preferably, between 0.1 and 1 part by weight relative to 1.0 part by weight of silica powder. If the amount is smaller than 0.05 part by weight, a satisfactory effect can not be produced. On the other hand, the value exceeding 1.0 part by weight causes the product silicon carbide powder to exhibit the properties of the silicon carbide added as the nucleating agent to a noticeable extent. This is undesirable where it is intended to produce a silicon carbide powder having properties differing from those of the silicon carbide powder added as the nucleating agent.

For the case of using a compound or a substance forming silica powder, carbon powder or silicon carbide powder at high temperatures, the amount of the compound or the substance is determined such that the amount of the formed silica powder, carbon powder or silicon carbide powder falls within the range specified above.

The powdery mixture is baked under a non-oxidizing atmosphere such as the atmosphere of nitrogen, carbon monoxide, argon, ammonia and hydrogen at 1,350° C. to 1,850° C. Preferably, the baking should be carried out under the atmosphere of carbon monoxide or argon at 1,400° C. to 1,700° C. If the baking temperature is lower than 1,350° C., the reaction to form silicon carbide does not proceed satisfactorily. On the other hand, the baking temperature exceeding 1,850° C. causes growth of grain. Where nitrogen or ammonia is used as the non-oxidizing atmosphere, the baking should be performed at temperatures exceeding 1,550° C. because silicon nitride is formed if the baking is performed at temperatures up to 1,550° C.

According to this invention, silica is reduced by carbon so as to form silicon carbide. It is important to note that the reaction to form silicon carbide proceeds with the particle of the silicon carbide powder contained in the powdery mixture acting as the nucleus, rendering it possible to obtain a silicon carbide powder consisting of fine particles of uniform shape and size. Incidentally, the particle size of the produced silicon carbide powder is not larger than 1μ, in general, not larger than 0.5μ.

Where silicon powder is used as the substance forming silicon carbide powder at high temperatures, it is necessary to take measures to prevent the silicon powder from melting. Specifically, the powdery mixture is preliminarily heated to a temperature lower than the melting point of silicon so as to permit forming silicon carbide powder by the reaction between the silicon powder and carbon powder, followed by heating to the baking temperature. In this case, the desired reaction to form silicon carbide powder proceeds with the particle of the silicon carbide powder formed by the preliminary heating acting as the nucleus.

Where the powdery mixture contains an excessive amount of carbon powder, the produced silicon carbide powder contains unreacted carbon powder. In this case, the product powder should be exposed to temperatures of 600° to 850° C. under an oxidizing atmosphere so as to oxidize and remove the unreacted carbon.

Described in the following are Examples of this invention.

EXAMPLE 1

100 g of a powdery mixture consisting of 1 part by weight of silica powder having an average particle size of 0.01μ, 2.0 parts by weight of carbon black having an average particle size of 0.05μ, and 0.1 part by weight of β-silicon carbide powder having an average particle size of 0.4μ was put in a carbon container and baked for 5 hours at 1,600° C. under an argon stream of 2l/min. The baked material was subjected to oxidation at 700° C. for 2 hours under air atmosphere, thereby removing the unreacted carbon so as to obtain the aimed product of silicon carbide powder.

The product powder was found to have an average particle size of 0.6μ. It was also found by X-ray diffractometry that the product powder consisted of β-silicon carbide.

Figure 2:
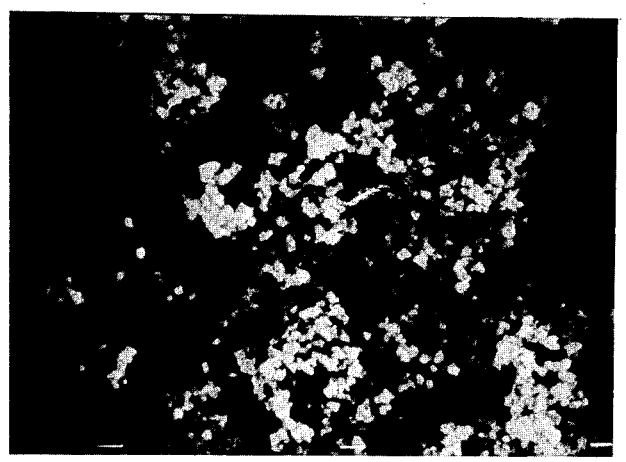
FIG. 2 is an electron photomicrograph showing silicon carbide powder particles obtained by one embodiment of this invention.

FIG. 2 is an electron photomicrograph (5000 magnifications) showing the particles of the product powder. It is seen that the silicon carbide particles are substantially uniform in shape and size.

CONTROL 1

A silicon carbide powder was obtained by repeating the procedures of Example 1, except that silicon carbide powder acting as the nucleating agent was not added to the powdery mixture.

FIG. 1 is an electron photomicrograph (5000 magnifications) showing the produced silicon carbide powder. As seen from FIG. 1, the powder particles were not uniform in either shape or size.

EXAMPLE 2

A silicon carbide powder was obtained by repeating the procedures of Example 1, except that 0.1 part by weight of silicon carbide powder prepared by vapor phase synthesis and having an average particle size of 0.1μ or less was substituted for the silicon carbide powder used in Example 1 and having an average particle size of 0.4μ. The product powder was found to have an average particle size of 0.3μ. It was also found by X-ray diffractometry that the product powder consisted of β-silicon carbide. Further, an electron photomicrograph of the product powder was similar to that of FIG. 2. Namely the particles of the product silicon carbide powder were substantially uniform in shape and size.

EXAMPLES 3 TO 12

Powdery mixtures consisting of various ratios of silica powder having an average particle size of 0.01μ, carbon powder having an average particle size of 0.03μ, and silicon carbide powder having an particle size of at most 0.4μ were baked under various conditions so as to obtain silicon carbide powders of uniform shape and size. Incidentally, each of the raw materials used was sufficiently high in purity. The following Table shows the results of the experiments.

TABLE

| Example | Raw Materials (part by weight) | | | Baking Condition | | | Product Properties | | |
|---|---|---|---|---|---|---|---|---|---|
| | SiO₂ | C | SiC | Temperature (°C.) | Time (hr) | atmosphere | particle size (μ) | Phase | Si + C (%) |
| Example 3 | 1 | 0.5 | 0.1 | 1650 | 3 | Argon | 0.6 | β | >98 |
| 4 | 1 | 0.6 | 0.1 | 1600 | 3 | " | 0.6 | " | " |
| 5 | 1 | 0.8 | 0.1 | 1550 | 4 | " | 0.5 | " | " |
| 6 | 1 | 1 | 0.5 | 1500 | 4 | " | 0.5 | " | " |
| 7 | 1 | 1 | 0.5 | 1600 | 3 | N₂ + CO | 0.6 | " | " |
| 8 | 1 | 2 | 0.05 | 1650 | 3 | Argon | 0.7 | " | " |
| 9 | 1 | 2 | 0.1 | 1650 | 2 | " | 0.6 | " | " |
| 10 | 1 | 2 | 0.5 | 1600 | 3 | " | 0.5 | " | " |
| 11 | 1 | 2 | 1 | 1400 | 5 | " | 0.5 | " | " |
| 12 | 1 | 4 | 0.1 | 1500 | 3 | " | 0.6 | " | " |

*After the baking, the baked material was subjected to oxidation at 700° C. for 5 hours under air atmosphere for removing the unreacted carbon.

As apparent from the Examples reported above, the method of this invention permits producing a silicon carbide powder consisting of fine particles of uniform shape and size.

What we claim is:

1. A method of producing a silicon carbide powder, comprising, forming a powerdery mixture consisting of 1 part by weight of silica powder or a compound forming silica powder at the baking temperature employed, 0.5 to 4 parts by weight of carbon powder or a compound forming carbon powder at said baking temperature, and 0.05 to 1 part by weight of silicon carbide powder, the amounts of the silica powder-forming compound, and the carbon powder-forming compound being such that the amounts of the formed silica and carbon powders are equal to those specified above and baking said mixture at 1350° C. to 1850° C. under a non-oxidizing atmosphere selected from the group consisting of carbon monoxide, argon and hydrogen to produce a silicon carbide powder consisting of fine particles of uniform size and shape.

2. The method according to claim 1, wherein the baking is carried out at 1,400° C. to 1,700° C.

3. A method of producing a silicon carbide powder, comprising forming a powdery mixture consisting of 1 part by weight of silica powder or a compound forming silica powder at the baking temperature employed, 0.5 to 4 parts by weight of carbon powder or a compound forming carbon powder at said baking temperature, and 0.05 to 1 part by weight of silicon carbide powder, the amounts of the silica powder-forming compound, and the carbon powder-forming compound being such that the amounts of the formed silica and carbon powders are equal to those specified above and baking said mixture at a temperature exceeding 1,550° C. under a non-oxidizing atmosphere selected from the group consisting of nitrogen and ammonia to produce a silicon carbide powder consisting of fine particles of uniform size and shape.

4. The method according to claim 1 or 3, wherein the amounts of carbon powder and silicon carbide powder range between 0.6 and 2 parts by weight and between 0.1 and 1 part by weight, respectively, relative to 1 part by weight of silica powder.

5. The method according to claim 1 or 3, wherein the average particle size of the silica powder, carbon powder and silicon carbide powder contained in the powdery mixture is at most $0.5\mu$.

* * * * *